US008714222B2

(12) United States Patent
Mancini

(10) Patent No.: US 8,714,222 B2
(45) Date of Patent: May 6, 2014

(54) METHOD AND APPARATUS FOR MANUFACTURING PNEUMATIC TYRES

(75) Inventor: Gianni Mancini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1361 days.

(21) Appl. No.: 12/087,240

(22) PCT Filed: Dec. 28, 2005

(86) PCT No.: PCT/IT2005/000769
§ 371 (c)(1),
(2), (4) Date: Dec. 19, 2008

(87) PCT Pub. No.: WO2007/074482
PCT Pub. Date: Jul. 5, 2007

(65) Prior Publication Data
US 2011/0126963 A1    Jun. 2, 2011

(51) Int. Cl.
*B29D 30/24*    (2006.01)
(52) U.S. Cl.
USPC ........ 156/358; 156/110.1; 156/111; 156/117; 156/128.1; 156/130; 156/133; 156/396; 156/397; 156/405.1; 156/406.4
(58) Field of Classification Search
USPC ........... 156/110.1, 111, 117, 128.1, 130, 133, 156/396, 397, 405.1, 406.4
See application file for complete search history.

(56) References Cited

U.S. PATENT DOCUMENTS

| | | |
|---|---|---|
| 4,792,370 A | 12/1988 | Goodfellow |
| 5,632,836 A | 5/1997 | Verschoor et al. |
| 5,635,016 A | 6/1997 | Byerley |
| 5,709,768 A | 1/1998 | Byerley |
| 6,328,084 B1 | 12/2001 | Caretta et al. |
| 6,468,016 B1 | 10/2002 | Roman |
| 6,488,797 B1 * | 12/2002 | Kirby ............................ 156/131 |
| 2001/0002608 A1 | 6/2001 | Okada et al. |
| 2003/0102088 A1 | 6/2003 | Iiduka |

FOREIGN PATENT DOCUMENTS

| | | |
|---|---|---|
| CN | 1221686 A | 7/1999 |
| DE | 10 2004 008 306 A1 | 9/2005 |
| EP | 0 776 756 A2 | 6/1997 |
| EP | 1 106 335 A2 | 6/2001 |

(Continued)

OTHER PUBLICATIONS

Notification of the Second Office Action with English language translation issued by Patent Office of the People's Republic of China on Oct. 18, 2010, in corresponding Chinese Application No. 200580052433.0.

(Continued)

*Primary Examiner* — Katarzyna Wyrozebski Lee
*Assistant Examiner* — Joshel Rivera
(74) *Attorney, Agent, or Firm* — Finnegan, Henderson, Farabow, Garrett & Dunner, L.L.P.

(57) ABSTRACT

On a building drum, anchoring structures to beads, carcass plies, a belt structure and/or other annular composite components are sequentially assembled with a liner, sidewalls, sidewall inserts, under-belt inserts or other annular elastomer components. Each of the sidewall inserts, sidewalls, or under-belt inserts is made as a one piece construction in a service station operating far away from the building drum for storage on a movable storing device. Actuating members operating on the movable storing device carry the annular elastomer components from the service station to the building drum. A transfer member picks up the annular elastomer components from the movable storing device to transfer them to the building drum.

51 Claims, 5 Drawing Sheets

(56) References Cited

FOREIGN PATENT DOCUMENTS

| | | |
|---|---|---|
| EP | 1 120 361 A2 | 8/2001 |
| WO | WO 03/053662 A1 | 7/2003 |
| WO | WO 2004/041520 A1 | 5/2004 |
| WO | WO 2005/105419 A1 | 11/2005 |

OTHER PUBLICATIONS

Notification of the First Office Action with English language translation issued by The Patent Office of the People's Republic of China on Jan. 22, 2010 in Chinese Application No. 200580052433.0.

* cited by examiner

METHOD AND APPARATUS FOR MANUFACTURING PNEUMATIC TYRES

CROSS REFERENCE TO RELATED APPLICATION

This application is a national phase application based on PCT/IT2005/000769, filed Dec. 28, 2005, the content of which is incorporated herein by reference.

BACKGROUND OF THE INVENTION

1. Field of the Invention

The present invention relates to a method of manufacturing pneumatic tyres for vehicle wheels.

The invention also is concerned with an apparatus for manufacturing pneumatic tyres for vehicle wheels.

2. Description of the Related Art

A pneumatic tyre for vehicle wheels generally comprises a carcass structure including at least one carcass ply internally coated with an airtight layer usually referred to as "liner", and having respectively opposite end flaps turned up loop-wise around annular anchoring structures, each usually consisting of a substantially circumferential annular insert to which at least one filling insert is applied, at a radially external position.

Associated with the carcass structure is a belt structure comprising one or more belt layers, disposed in radial superposed relationship with respect to each other and to the carcass ply and having textile or metallic reinforcing cords with a crossed orientation and/or substantially parallel to the circumferential extension direction of the tyre. Applied to the belt structure at a radially external position is a tread band.

Respective sidewalls of elastomer material are also applied to the side surfaces of the carcass structure, each extending from a so-called "shoulder region" localised close to one of the side edges of the tread, band until close to the respective annular anchoring structure to the beads.

In most of the known production processes use of at least one building drum is provided on which the individual semifinished components of the carcass structure are assembled in a predetermined sequence.

Usually, the belt structure and tread band constitute a so-called "belt package" that is made separately on a respective auxiliary drum to be subsequently assembled to the carcass structure on the building drum in processes of the "unistage" type, or on a so-called "shaping drum" in processes of the "two-stage" type.

In manufacturing tyres for specific or particular uses, integration of additional annular components into the carcass or belt structure may be required.

For example, insertion of the so-called "under-belt elongated elements" of elastomer material may be required, each of said elongated elements extending circumferentially between the carcass structure and one of the side edges of the belt structure. In building self-supporting or run flat tyres, i.e. such made as to enable running under acceptable safety conditions even when the tyre is partly or wholly deflated, additional annular reinforcing inserts are required to be integrated into the carcass structure; said inserts are usually called "sidewall inserts" and their task is substantially to bear the load resting on the wheel when, following a puncture for example, the inflating pressure of the tyre is reduced or is completely absent.

Document U.S. Pat. No. 6,488,797 depicts a run flat tyre provided with sidewall inserts of elastomer material of such a length that it substantially extends from the shoulder region of the tyre to the corresponding bead region. In tyre manufacture, these sidewall inserts are circumferentially disposed to a suitable mutual axial distance on the building drum, before or after application of the liner, and before application of the carcass ply or plies.

The sidewall inserts are usually made starting from at least one continuous strip of elastomer material obtained by extrusion, from which segments of appropriate length are cut out. Each segment is circumferentially applied around the building drum, and the extremities of same are end-to-end joined.

In the process described in DE-10 2004 008 306, the sidewall inserts are made separately of the tyre being manufactured on the building drum by joining the extremities of a semifinished product in the form of a strip on a flat surface, so as to improve the end-to-end joint quality. The sidewall inserts are subsequently engaged on the building drum to be associated with the other tyre components. Alternatively, the sidewall inserts can be directly made in the form of a loop without joining points, by injection moulding for example, and subsequently transferred onto the building drum.

Document US-2003/102,088 discloses a manufacturing method according to which several different tyre components, among which the sidewall inserts for a run flat tyre, are formed through spiral winding of a strip of raw elastomer material on an outer circumferential surface of the building drum.

In document WO-2005/105419, in the name of the same Applicant, a method of building run flat tyres is proposed in which the sidewall inserts are made on a service drum to be subsequently transferred onto the building drum on which assembling of the components of the carcass structure is carried out. Each sidewall insert is formed through winding of a continuous elongated element of elastomer material into coils disposed consecutively in side by side relationship on the service drum. Thus circumferential discontinuities and other faults are eliminated, which faults are due to the presence of end-to-end joints for example in the inserts obtained from segments of an extruded strip.

SUMMARY OF THE INVENTION

However, in accordance with the present invention, the Applicant has perceived the possibility of greatly improving the manufacturing methods of the known art, in terms both of productivity and quality of the obtained product.

In this connection the Applicant could observe that in tyre manufacture, in the case of run flat tyres for example, in which integration of additional annular elastomer components is required as compared with those usually provided in the building lines for traditional tyres, the operations to be executed on a building drum for manufacturing the carcass structure need a cycle time higher than that for the operations carried out on the auxiliary drum for manufacture of the belt structure and possibly of the tread band.

The Applicant has further become aware of the fact that manufacture of the sidewall inserts in a separate service station as suggested by DE-10 2004 008 306 and WO-2005/105419 can give rise to difficulties in adapting building apparatus conceived for a given type of tyre, to the manufacture of tires into the structure of which additional annular elastomer components, such as sidewall inserts, under-belt elongated elements or others, are required to be integrated. In particular, the Applicant has identified one of the above mentioned difficulties of adaptation in the necessity to synchronise the required cycle times for manufacture of the sidewall inserts in the service station, the carcass structure on the building drum and the belt structure on the auxiliary drum, respectively. In fact the Applicant has verified that manufacture of the sidewall inserts as one-piece semifinished products cannot be easily obtained with a continuity compatible with the production rate typical of the tyre building lines.

In accordance with the present invention, the Applicant has found the possibility of adapting building apparatus conceived for manufacture of a given type of tyre, to the manufacture of tyres the structure of which asks for integration of additional annular elastomer components, by making one or more of the annular elastomer components of the tyre, such as the sidewall inserts, sidewalls, or so-called under-belt elongated elements, in a service station, said components being subsequently stored on a movable storing device to be transported close to the building drum and delivered based on the rate required by the cycle time of the assembling operations carried out on the building drum itself.

In this way, synchronisation of the cycle times on the service station and the building drum is obtained, which will bring about a reduction in the building times on the building drum and in the waiting times on the auxiliary drum for the tyre components assembled thereon.

Therefore important advantages are achieved, particularly in terms of productivity and process simplification.

In more detail, in a first aspect, the present invention relates to a method of manufacturing pneumatic tyres, each pneumatic tyre comprising: a carcass structure having at least one carcass ply and annular anchoring structures engaging respective end flaps of the carcass ply; a tread band at a radially external position to the carcass structure; a belt structure interposed between the carcass structure and tread band; a pair of axially opposite sidewalls radially extending from each end flap of the carcass ply to the tread band, said method comprising assembling of at least one annular elastomer component on a building drum, wherein said assembling step comprises the steps of: forming said at least one annular elastomer component; storing said at least one annular elastomer component on a movable storing device carrying a plurality of said previously-stored annular elastomer components; transporting said at least one annular elastomer component until close to said building drum; transferring said at least one annular elastomer component from the movable storing device to the building drum.

In a second aspect, the present invention relates to an apparatus for manufacturing pneumatic tyres, each pneumatic tyre comprising: a carcass structure having at least one carcass ply and annular anchoring structures engaging respective end flaps of the carcass ply; a tread band at a radially external position to the carcass structure; a belt structure interposed between the carcass structure and tread band; a pair of axially opposite sidewalls radially extending from each end flap of the carcass ply to the tread band, said apparatus comprising: a building drum; forming devices operating in a service station, to form at least one annular elastomer component; at least one movable storing device for engagement of a plurality of said annular elastomer components made in said service station; devices for loading the annular elastomer components made in the service station onto said at least one movable storing device; actuating members operating on the movable storing device to transport the annular elastomer components from the service station to the building drum; devices for transferring the annular elastomer components from the movable storing device to the building drum.

Preferably, loading of the annular elastomer components is carried out on circumferentially distributed abutment elements carried by the movable storing device. In this manner it is possible to handle the raw annular elastomer components without running the risk of inducing undesirable permanent sets thereon.

Preferably, transport of the annular elastomer components is advantageously carried out by translation of said components along an actuating circuit extending in a closed loop, along which a storage station and a transfer station are located, for storage of the annular elastomer components on the movable storing device and transfer of said components onto the building drum, respectively.

Alternatively, a plurality of actuating circuits can be provided which are adapted to be individually translated from the storage station to the transfer station so that more logistic adaptability of the apparatus to already existing production plants can be obtained.

Each annular elastomer component consisting of a sidewall insert, an under-belt insert or a sidewall of the tyre for example, can be advantageously formed in one piece, preferably by injection or compression moulding, or through winding of at least one continuous elongated element into coils disposed close to each other on a forming drum.

Further features and advantages will become more apparent from the detailed description of a preferred but not exclusive embodiment of a method and an apparatus for manufacturing pneumatic tyres for vehicle wheels, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
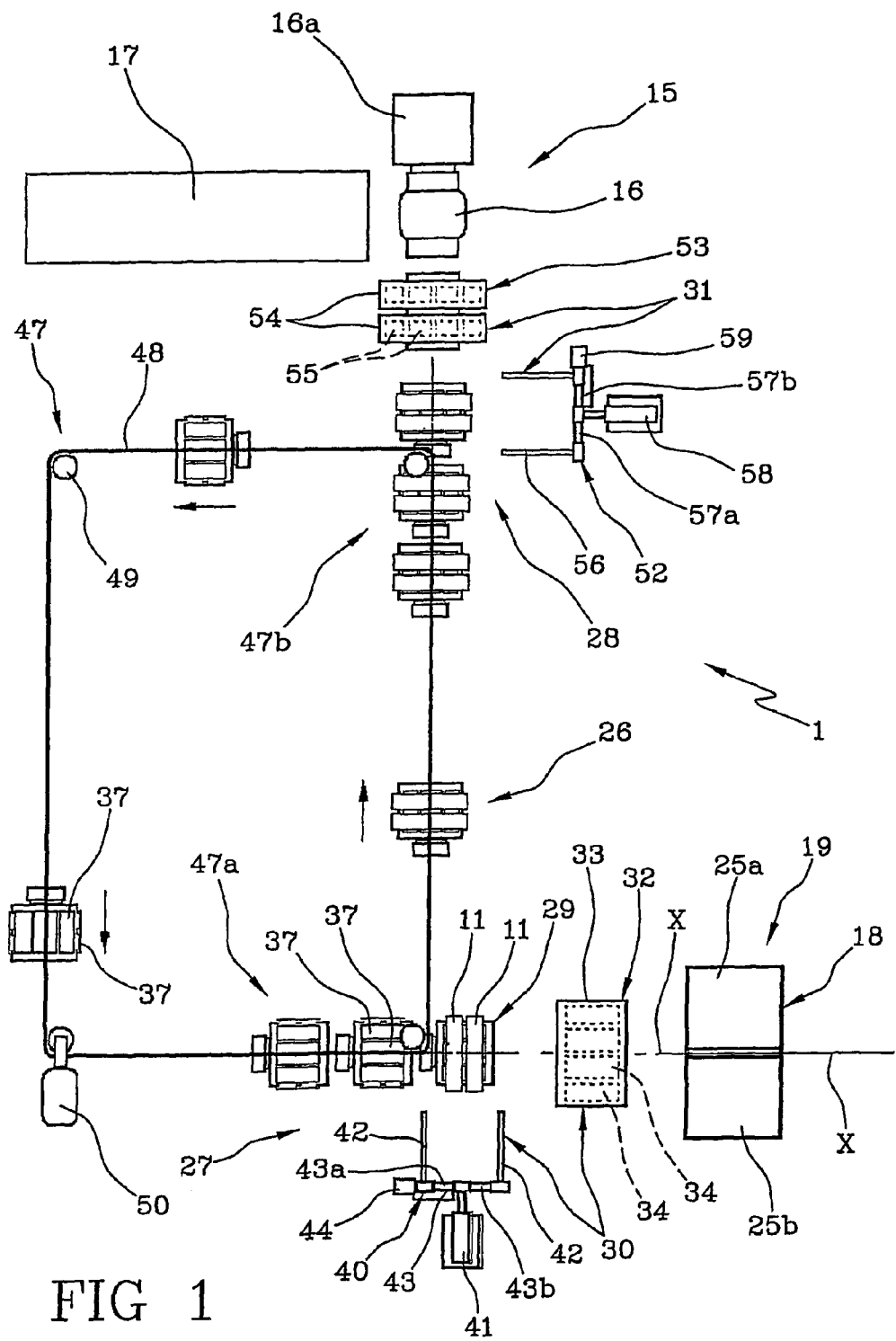
FIG. 1 diagrammatically shows an apparatus for building pneumatic tyres in accordance with the present invention.

With reference to the drawings, an apparatus for manufacturing pneumatic tyres for vehicle wheels, designed to carry out a method in accordance with the present invention has been generally identified by reference numeral 1.

The invention aims at manufacturing pneumatic tyres of the type generally denoted at 2 in FIG. 9 and essentially comprising a carcass structure 3 of substantially toroidal conformation, a belt structure 4 circumferentially extending around the carcass structure 3, a tread band 5 applied to the belt structure 4 at a radially external position and a pair of sidewalls 6 laterally applied to the carcass structure 3 on opposite sides and each extending from a side edge 5a of the tread band 5 until close to a so-called bead 7a localised along a respective radially internal edge of tyre 2.

The carcass structure 3 comprises a pair of annular anchoring structures 7 integrated into the beads 7a and each made up of a so-called bead core 8 for example, which carries an elastomer filler 9 at a radially external position. Turned up around each of the annular anchoring structures are the end flaps 10a of one or more carcass plies 10 comprising textile or metallic cords extending transversely of the circumferential extension of tyre 2, possibly following a predetermined inclination, from one of the annular anchoring structures 7 to the other.

Also provided are annular reinforcing inserts 11 of elastomer material, hereinafter referred to as "sidewall inserts", axially applied internally of the carcass ply 10 to bear the loads transmitted between the belt structure 4 and annular anchoring structures 7 when tyre 2, following a puncture for example, is forced to run in a partly or fully deflated condition. Each sidewall insert 11 has a substantially lenticular cross-section profile gradually tapering towards a radially external apex thereof 11a disposed in the vicinity of a corresponding side edge 4a of the belt structure 4 and a radially internal apex 11b located on the opposite side, close to the annular anchoring structure 7.

Each sidewall insert 11 extends through a maximum-chord point, i.e. in the region of maximum axial size of tyre 2, where a region of maximum thickness 11c of the sidewall insert itself can be identified.

The carcass ply 10 can be internally coated with a so-called "liner" 12 made up of at least one elastomer layer of a butyl base for example, having a satisfactory air-tightness. Liner 12 can cover the whole extension of the inner surfaces of the carcass structure 3, from one of the beads 7a to the other. Alternatively, the liner can have an interrupted extension in the regions concerned with the sidewall inserts 11, with end flaps 12a joined to the radially external apices 11a of the sidewall inserts 11.

The belt structure 4 in turn can comprise one or more belt layers 13a, 13b including metallic or textile cords suitably inclined to the circumferential extension of tyre 2, following respectively crossed orientations between one belt layer and the other, as well as a possible outer belting layer (not shown) generally identified as "0-degree layer" and comprising one or more cords circumferentially wound up into coils disposed in axial side by side relationship around the belt layers 13a, 13b.

Annular inserts in the form of an elongated element of elastomer material, identified as "under-belt inserts" 14 can be interposed between each of the opposite side edges of the belt structure 4 and the underlying carcass ply 10.

Each of the sidewalls 6 and tread band 5 essentially comprises at least one layer of elastomer material of suitable thickness. Also associated with the tread band 5 can be a so-called underlayer (not shown) of elastomer material having suitable compositions and physico-chemical characteristics and acting as an interface between the true tread band 5 and the underlying belt structure 4.

Different components of the carcass structure 3 and belt structure 4 are prepared in the form of semifinished products, preferably made during preceding work steps, to be suitably assembled with each other for the purpose of building tyre 2.

To the aims of the present specification and the following claims, the different semifinished components to be assembled for manufacturing tyre 2 are divided into two typologies. In fact, there are semifinished products in the form of a composite component, such as the annular anchoring structures 7, carcass ply or plies 10 and belt layers 13a, 13b, that are essentially made up of elongated structural inserts, in particular threads or cords of textile or metallic material, coupled with fillers of elastomer material represented by coating rubber layers for example, usually associated with the cords of the carcass plies and belt layers.

There also are semifinished products made in the form of an elastomer component, i.e. exclusively consisting of elastomer material uncoupled from any thread-like structural reinforcing insert, such as the textile or metallic reinforcing threads or cords. Among said semifinished products in the form of an annular elastomer component there are for example, the sidewall inserts 11 and under-belt inserts 14 and the underlayer interposed between the belt structure and tread band.

To the aims of the present invention it is to be pointed out that by the term "elastomer material" it is intended a composition comprising at least one elastomer polymer and at least one reinforcing filler. Preferably, this composition further comprises additives such as cross-linking agents and/or plasticizers. Due to the presence of the cross-linking agents this material can be cross-linked through heating so as to form the final manufactured product.

Unlike the annular composite components, the annular elastomer components have a very weak structural consistency that can be hardly handled without inducing permanent sets.

Apparatus 1 comprises a building station 15 carrying at least one building drum 16 on which assembling of at least part of the components designed to form the carcass structure 3 of tyre 2 is carried out. The building drum 16 can indifferently consist of a first-stage drum where, as in the example shown, a two-stage building process is carried out, or of a building drum of the type usually called "unistage", where a building process in a single stage is wished to be carried out.

The building drum 16 not described in detail because it can be made in any convenient manner, can be formed of expandable sectors.

The building drum 16 can be supported in cantilevered relationship in the building station 15 provided with respective mandrel 16a for conveniently supporting it and driving it in rotation in case of need, during application of the components of the carcass structure 3.

In the example described by way of indication, the building drum 16 is adapted to first receive the sidewall inserts 11, upon the action of suitable devices described in more detail in the following. The optional liner 12, in the form of a strip and coming from a feeding line or other suitable devices not shown, can be applied before or after application of the sidewall inserts 11. Preferably, the liner is applied after application of the sidewall inserts 11 and the opposite edges 12a of said liner are each joined along the radially external apex 11a of the sidewall inserts themselves.

Then the carcass ply 10 is wrapped around the building drum 16, so as to form a cylindrical sleeve. The carcass ply 10 can be fed in the form of a continuous strip from a feeding line 17 or other suitable devices. Afterwards, annular anchoring structures 7 formed of the bead cores 8 pre-assembled to the respective fillers in the form of annular composite components are fitted on the opposite end flaps 10a of the carcass ply 10. Turning up of the end flaps 10a of the carcass ply 10 around the annular anchoring structures 7 can be subsequently carried out. Also provided can be application of the sidewalls 6 on the building drum 16 carried out by devices not shown before or after application of the carcass ply 10, depending on the construction process.

At the same time as manufacture of the carcass structure 3 occurs on the building drum 16, the belt structure 4 is being made in an auxiliary work station not shown, and possibly coupled with the tread band 5 to form a so-called "belt package". This belt package will be subsequently coupled with the carcass structure 3 concurrently with a step of shaping the same according to a toroidal conformation, carried out on the building drum 16 itself ("unistage" building process) or after transferring the carcass structure onto a specific shaping drum ("two-stage" building process).

In accordance with the present invention, at least one of the annular elastomer components required for building tyre 2, such as the sidewalls 6, sidewall inserts 11 and/or under-belt inserts 14, is formed as a one piece construction by means of forming devices 18 operating in a service station 19 spaced away from the building drum 16.

In the embodiment described, the annular elastomer components made in the service station 19 consist of the sidewall inserts 11 preferably manufactured by injection or compression moulding. To this aim, the forming devices 18 comprise at least one injection or compression moulding unit, consisting of an inner die 20 and an outer die 21 to be concentrically coupled to define a moulding cavity 22 shaped like the annular elastomer component to be obtained.

It is to be noted that in case of compression moulding, it is generally necessary to prepare a semifinished product in blend, generally by extrusion, to join the semifinished product so as to form an endless toroid, and finally insert the latter into the press mould that can substantially be manufacture as the one for injection moulding.

Preferably, at least two of said moulding cavities 22 are defined between the inner die 20 and outer die 21 and they are axially spaced apart and disposed in mirror relationship.

The inner die 20 is preferably made in the form of a collapsible drum comprising first circumferential sectors 23 that are mutually movable between a work condition at which they are consecutively disposed in circumferential alignment around a geometric axis X-X to define the moulding cavity 22 together with the outer die 21, and a rest condition at which they are disposed radially close to the geometric axis X-X, to enable removal of the obtained sidewall inserts 11 therefrom.

The outer die 21 in turn comprises second circumferential sectors 24, that are mutually movable between a work condition at which they are consecutively disposed in circumferential alignment around the geometric axis X-X, and a rest condition at which they are radially moved apart from said geometric axis X-X, to enable removal of the sidewall inserts 11.

Preferably, the second circumferential sectors 24 of the outer die 21 are divided into two assemblies, carried by a first circumferential portion 25*a* and a second circumferential portion 25*b* respectively of the outer die 21, radially movable away from the geometric axis X-X after the second sectors 24 have been brought to the rest position, to efficiently clear the space around the inner die 20 and facilitate removal of the sidewall inserts 11 therefrom.

In a possible alternative embodiment, the forming devices 18 installed in the service station 19 can comprise a spiralling unit designed to wind at least one continuous elongated element into coils disposed close to each other on a forming drum to make the sidewall inserts 11 or other annular elastomer components, as described in document WO-2005/105419 in the name of the same Applicant, for example.

At least one movable storing device 26 operates between the service station 19 and building station 15; it is designed to receive the sidewall inserts 11 at a fixed storage station 27, disposed close to the service station 19, and carry the sidewall inserts 11 to a fixed transfer station 28 located in the vicinity of the building drum 16.

The movable storing device 26 is provided with a plurality of supporting members 29 each designed to engage at least one of the annular elastomer components 11, 14, 6 made by the service station 19. In more detail, each supporting member 29 preferably lends itself to engage a pair of sidewall inserts 11, simultaneously made by the injection or compression moulding unit 18.

Through loading devices 30, the sidewall inserts 11 obtained during each work cycle of the service station 19 are therefore stored on the movable storing device 26 to be brought to the building drum 16 together with a plurality of other sidewall inserts 11 previously made and stored.

Thus, decoupling between production of the sidewall inserts 11 in the service station 19 and building of the tyres in the building station 15 is advantageously obtained.

By means of transfer devices 31 installed in the transfer station 28, the sidewall inserts 11 are then transferred onto the building drum 16 at a rate corresponding to the requirements of the building station 15. Thus building of tyres 2 can be carried out in a substantially continuous manner, even in case of temporary productivity stops in the service station 19.

The loading devices 30 preferably comprise a first transfer member 32 movable between the service station 19 to pick up the sidewall inserts 11 produced by the moulding unit 18, and the storage station 27, to engage the sidewall inserts 11 on the movable storing device 26.

To this aim, the first transfer member 32 essentially comprises an annular structure 33 disposed or to be positioned concentric with the geometric axis X-X of the moulding unit 18 and internally carrying a plurality of circumferentially distributed pads radially movable towards the inside.

When moulding of the sidewall inserts 11 has been completed, the circumferential sectors 24 of the outer die 21 are moved away from the geometric axis X-X and said first and second circumferential portions 25*a*, 25*b* are radially moved away from the inner die 20 to enable insertion of the first transfer member 32.

For picking up the sidewall inserts 11 from the moulding unit 18, the annular structure 33 of the first transfer member 32 is brought around the inner die 20. Suitable optical and/or mechanical alignment devices, not shown as they can be made in any convenient manner, ensure correct axial alignment of the first transfer member 32 relative to the sidewall inserts 11.

By radial movement towards the geometric axis X-X of the moulding unit 18, the pads 34 are brought against the sidewall inserts 11.

The circumferential sectors 23 of the inner die 20 are then radially translated towards the geometric axis X-X, giving rise to contraction of the inner die and consequent disengagement of the sidewall inserts 11 that are retained by the pads 34 of the first transfer member 32.

The steady engagement between the sidewall inserts 11 and the first transfer member 32 can be ensured by suction devices operating through the pads 34.

The first transfer member 32 then moves towards the storage station 27 to provide the sidewall inserts 11 for storage on the movable storing device 26.

The operating sequence for engagement of the sidewall inserts 11 on the movable storing device 26 contemplates positioning of the sidewall inserts 11 around one of the supporting members 29 disposed at the storage station 27, by means of the first transfer member 32. Suitable optical and/or mechanical alignment devices operating in the storage station 27 ensure a precise axial positioning of the sidewall inserts 11 on the supporting member 29.

Figure 5:
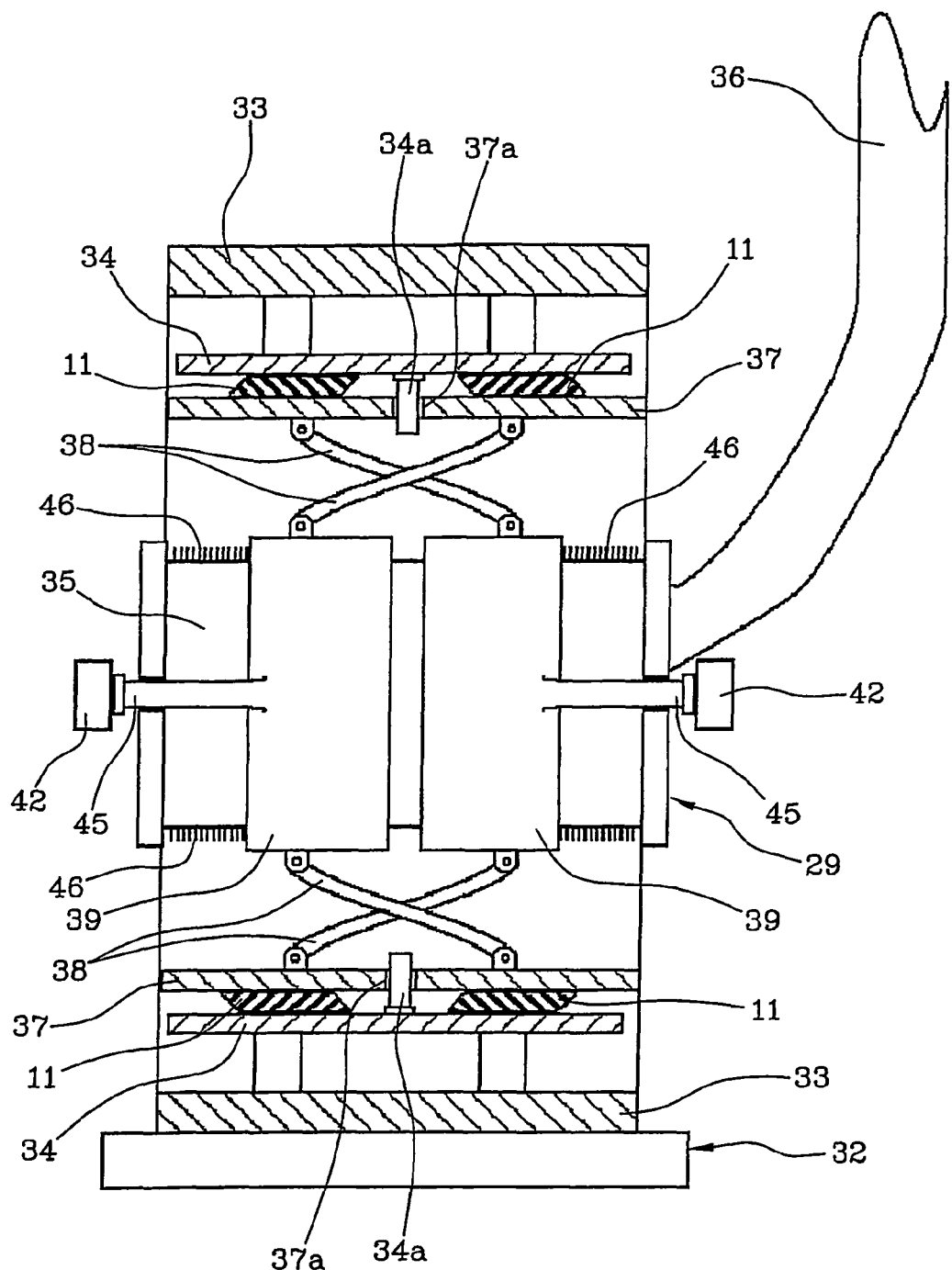
FIG. 5 is a diagrammatic view in diametrical section of one of the supporting members being part of the apparatus in accordance with the invention, interacting with a first transfer member and a first handler.
Figure 6:
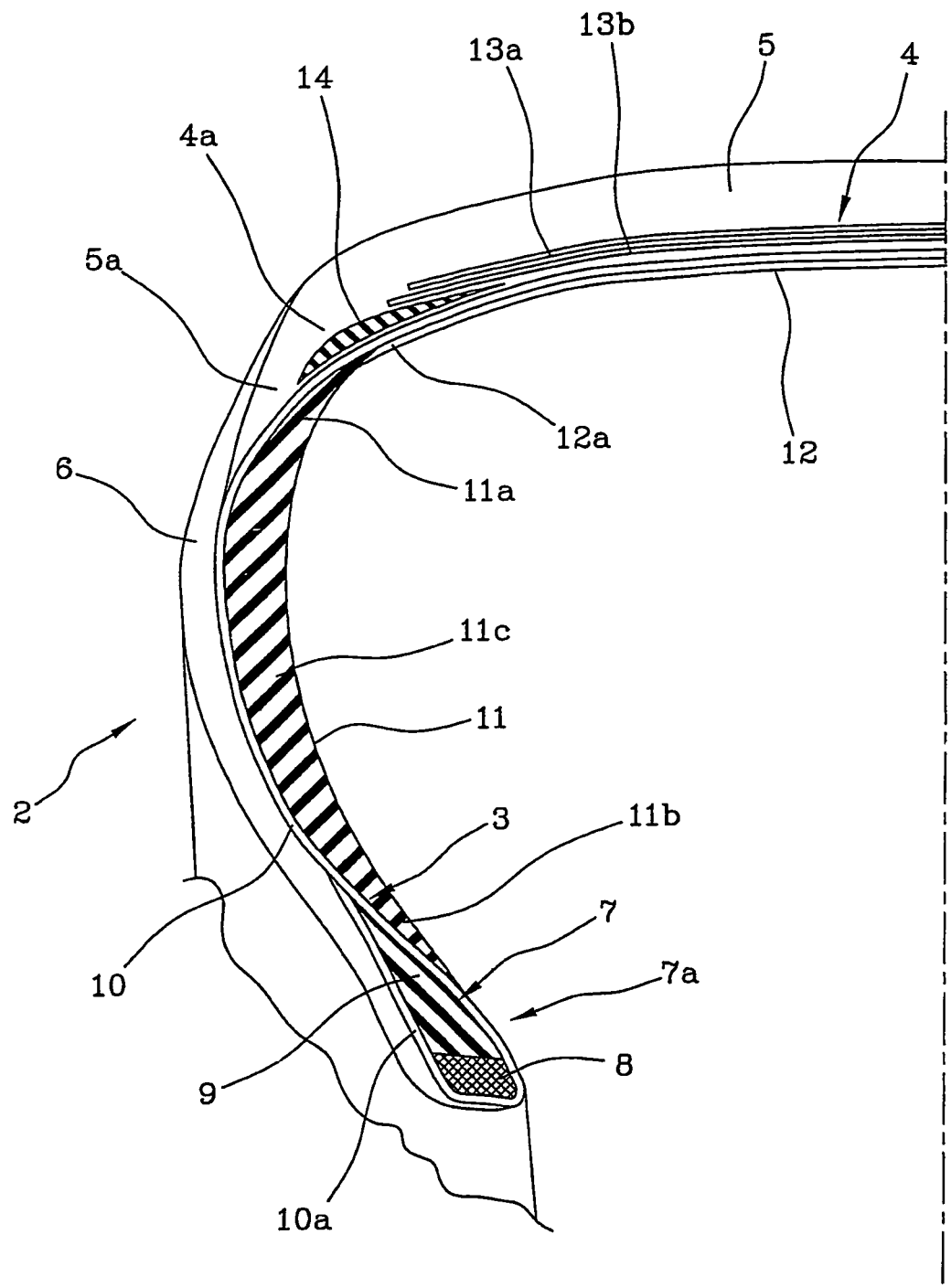
FIG. 6 is a diagrammatic cross-section view of a tyre obtainable in accordance with the present invention.

As better shown in FIG. 5, each supporting member 29 has a substantially cylindrical or prismatic central body 35, preferably having a horizontal axis, which is supported in cantilevered fashion by a support arm 36 and carries a plurality of circumferentially distributed abutment elements 37 simultaneously movable between a rest condition at which they are relatively close to the longitudinal axis of the central body 35 and spaced apart from the sidewall inserts 11, and an operating condition at which they act against the radially internal surfaces of the sidewall inserts 11 to cause engagement of same on the movable storing device 26.

In more detail, hinged on each abutment element 37, at axially spaced apart positions, are the ends of at least two mutually-crossed pantograph arms 38 the opposite ends of which, in turn, are hinged on a slider 39, preferably in the form of a collar, slidably guided along the central body 35. Sliders 39 are movable close to and away from each other along the central body 35 to cause simultaneous translation of the abutment elements 37 between the rest and operating conditions. For clarity and ease of representation, only two diametrically opposite abutment elements 37 are shown in FIG. 5.

To cause movement of the abutment elements 37 to the grip position, the loading devices 30 further comprise a first handler 40 installed in the storage station 27 and designed to act on the sliders 39 of the supporting member 29 disposed in the storage station itself.

In more detail, the first handler 40 is movable upon command of a fluid-operated actuator 41 between a waiting position, at which it is spaced apart from the supporting member 29 located in the storage station 27, and an operating position at which it interacts with the supporting member itself by a pair of drive arms 42 movable close to each other, starting from a spread apart condition at which they are mutually spaced apart by an amount greater than the axial size of the first transfer member 32 and of the supporting member 29.

Translation of the drive arms 42 is obtained by means of a double screw 43 operatively engaging the drive arms 42 by two threads respectively, a right-hand 43a thread and a left-hand 43b thread respectively.

After the fluid-operated actuator 41 has brought the first handler 40 to the work position, the double screw 43 is driven in rotation by a motor 44 to cause mutual approaching of the drive arms 42. Consequently, the drive arms 42 are brought against respective locating elements 45 (FIG. 5) integral with slider 39 and axially projecting from opposite sides relative to the central body 35 of the supporting member 29. Consequent mutual approaching of sliders 39 causes radial translation of the abutment elements 37 through the pantograph arms 38, until said abutment elements 37 are brought to act against the inner surfaces of the sidewall inserts 11.

In the end step of translating the abutment elements 37 to the grip position, dowels 34a associated with the pads 34 of the first transfer member 32 are fitted into corresponding alignment seats 37a provided in each of the abutment elements 37. Thus a perfect axial alignment of the abutment elements 37 relative to the sidewall inserts 11 is ensured.

At the same time, possible sensors associated with the dowels 37a detect the correct alignment of the abutment elements 37 when the grip position is reached, and send an enable signal for execution of the subsequent process steps.

Upon reaching the grip condition, the first transfer member 32 circumferentially operating on the sidewall inserts 11 on the opposite side with respect to the abutment elements 37, counteracts a further translation of the abutment elements 37 themselves away from the rest condition.

Suitable detectors, designed to monitor electric absorption of motor 44 for example, detect reaching of the operating condition by the abutment elements 37 and operate reverse driving in rotation of the double screw 43, to disengage the drive arms 42 from the locating elements 45 and allow coming back of the first handler 40 to the waiting position.

Stop devices 46 associated with sliders 39 lock the abutment elements 37 to the operating position so as to cause steady engagement between the sidewall inserts 11 and abutment elements 37 to enable spreading apart of the pads 34 associated with the transfer member 32 and coming back of the latter to a waiting position, disposed between the storage station 27 and service station 19.

These stop devices 46 can comprise friction members for example, such as bristle elements or elements consisting of teeth of plastic material provided with suitable elasticity and stiffness characteristics, operating between the sliders 39 and central body 35 and adapted to generate a sufficient friction to counteract undesirable movements of the abutment elements 37 due to weight or possible elastic or heat contractions of the sidewall inserts 11, without however inhibiting movement of same upon command of the first handler 40.

Actuating members 47 operating on the movable storing device 26 then carry out transport of the sidewall inserts 11 carried by the supporting member 29 to the transfer station 28, so that the storage station 27 is ready for engagement of new sidewall inserts 11 on the adjoining supporting member 29.

These actuating members 47 comprise at least one actuating circuit extending in a closed loop and defined by a cableway comprising at least one chain, rope or other suitable traction member 48 engaged on respective idler pulleys 49, and at least one traction motor 50, 50a, 50b operating on one of said pulleys.

In the embodiment shown in FIG. 1, the traction member 48 co-operates with automatic coupling devices, not shown as they can be made in any convenient manner, associated with each of the supporting members 29, preferably at the end of the support arm 36 opposite to the central body 35, to enable engagement and disengagement thereof with the traction member 48 at the storage station 27 and the transfer station 28 distributed along said actuating circuit. In more detail, each supporting member 29 is coupled with the traction member 48 to be carried from the storage station 27 to the transfer station 28, and vice versa. Each supporting member 29 is on the contrary disengaged from the traction member 48 when it reaches a first and a second waiting sections 47a, 47b respectively, that are defined along the actuating circuit 47 at the storage station 27 and the transfer station 28, respectively.

Figure 2:
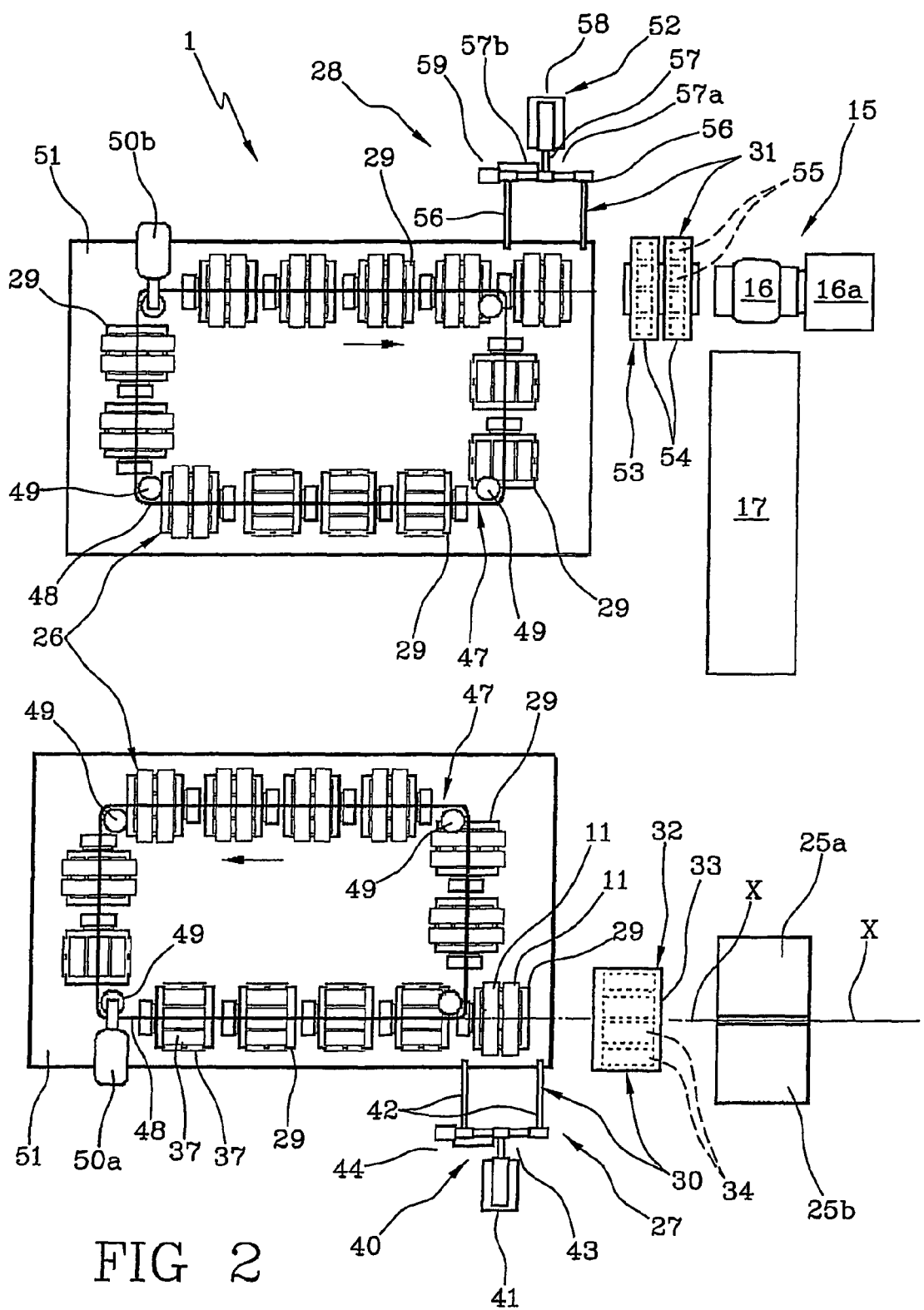
FIG. 2 shows an alternative embodiment of the apparatus in FIG. 1.
Figure 3:
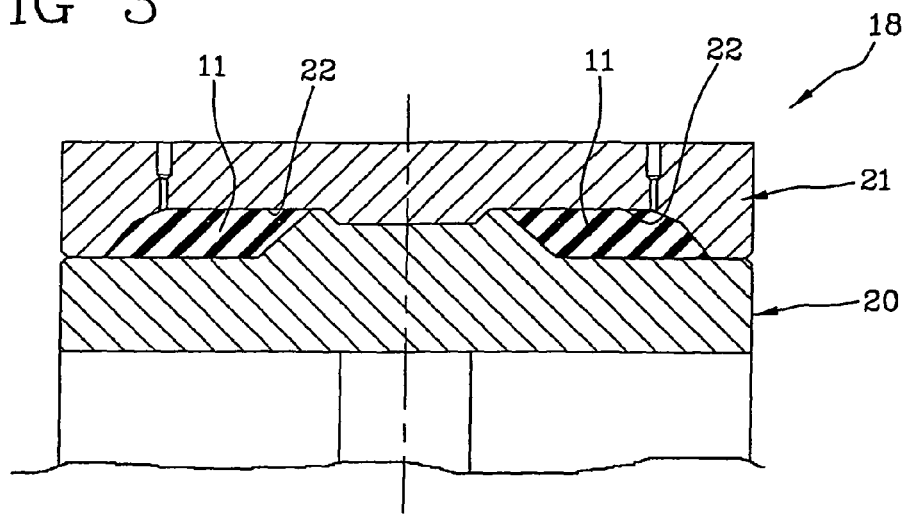
FIG. 3 diagrammatically shows cross-section views of forming devices operating in a service station being part of the apparatus in reference, during forming of two sidewall inserts.
Figure 4:
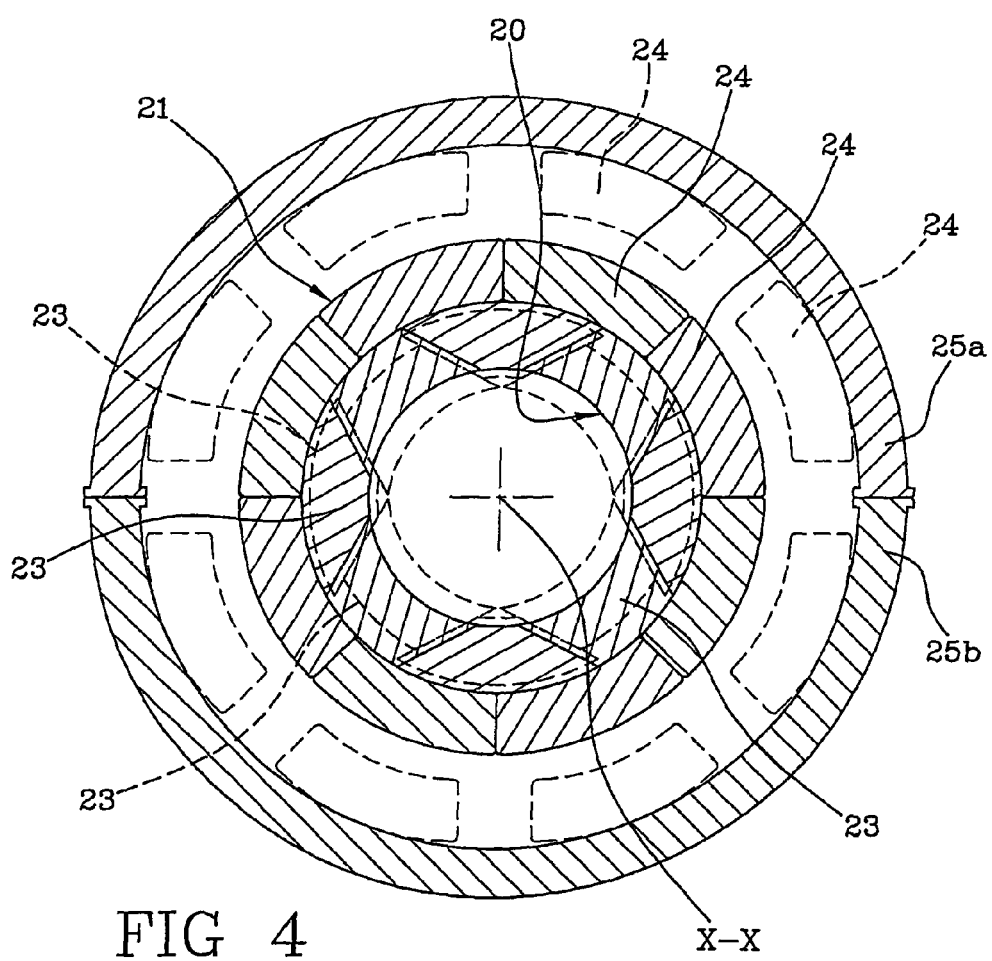
FIG. 4 is a diagrammatic view in diametrical section of the forming devices seen in FIG. 3.

In the embodiment shown in FIG. 2, the movable storing device 26 comprises two or more actuating circuits mounted on respective movable platforms 51 and each carrying a plurality of supporting members 29. The movable platforms 51 can be made in the form of an independently powered vehicle, or in the form of a palletised load susceptible of removable engagement with suitable conveyer vehicles, to translate each actuating circuit from the storage station 27 to the transfer station 28. In this manner the stored material can be better protected by suitable tarpaulins or shutters (not shown) associated with the platforms 51, that can be opened at the loading and/or transfer points where the transfer members operate.

In the storage station 27 and the transfer station 28, a first and a second traction motors 50a, 50b are respectively installed; they can be operatively engaged with one of the idler pulleys 49 carried by the actuating circuit 47 positioned in the storage station 27 or transfer station 28, so as to individually position the supporting members 29 in succession in a loading/unloading position. The supporting member 29 positioned in the loading/unloading station interacts with the loading devices 30 for engagement of the sidewall inserts 11 in the previously described manner.

Each supporting member 29 reaching the transfer station 28 is submitted to the action of transfer devices 31 preferably comprising at least on second handler 52 to disengage the sidewall inserts 11 from the supporting member 29 and a second transfer member 53 designed to pick up the sidewall inserts 11 from the supporting member 29 in the transfer station 29 and engage them on the building drum 16.

More particularly, the second transfer member 53, of the same structure as the first transfer member 32, comprises a second annular structure 54 internally carrying second pads 55 that are circumferentially distributed and radially movable towards the inside.

For picking up of the sidewall inserts 11 from the supporting member 29 positioned in the transfer station 28, the second transfer member 53 is brought with the second annular structure 54 around the supporting member 29 itself. Suitable optical and/or mechanical alignment devices ensure correct axial alignment of the second transfer member 53 relative to the sidewall inserts 11.

By radial movement towards the longitudinal axis of the central body 35 of the supporting member 29, the second pads 55 are brought against the sidewall inserts 11.

In the same manner as described with reference to the first handler 40, the second handler 52 comprises a pair of second movable drive arms 56 that can be shifted close to each other starting from a spread apart condition at which they are mutually spaced apart by a greater amount than the axial size of the second transfer member 53 and of the supporting member 29.

Translation of the second drive arms 56 is obtained by means of a second double screw 57 operatively engaging the arms themselves, by two threads respectively, a right-hand thread 57a and a left-hand thread 57b respectively.

After the second handler 52 has been brought to a respective work position upon command of a further fluid-operated actuator 58, the second double screw 57 is driven in rotation through a second motor 59 to cause mutual approaching of the second drive arms 56. Consequently, the second drive arms 56 are brought into engagement against the locating elements 45 of the supporting member 29, possibly with the aid of electromagnets not shown, associated with the second arms and selectively activated upon command of a detector not shown for example, which detects an increase in the electric absorption of the second motor 59 when the second drive arms 56 come against the locating elements 45.

When engagement has occurred, a reverse rotation of the second double screw 57 is operated. The resulting mutual moving apart of sliders 39 causes, through the pantograph arms 38, radial translation of the abutment elements 37 away from the inner surfaces of the sidewall inserts 11, retained by the second transfer member 53.

After de-energising of the electromagnets carried by the second drive arms 56, the second fluid-operated actuator 58 brings the second handler 52 back to a waiting position, at which it is spaced apart from the supporting member 29 positioned in the transfer station 28, to enable axial translation of the second transfer member 53 in order to remove the sidewall inserts 11 from the supporting member 29, and transfer of said inserts onto the building drum 16.

The annular structure 54 of the second transfer member 53, as well as that of the first transfer member 32 can be obtained as a one piece construction if the moulding cavities 22 provided in the moulding unit 18 are spaced apart by the same distance between centres as that according to which the sidewall inserts 11 are to be positioned on the building drum 16. Alternatively, at least the second transfer member 53 can be provided with an annular structure 54 axially divided into two halves, each equipped with a circumferential series of pads 55 and mutually movable in an axial direction to adapt the distance between centres of the sidewall inserts before positioning them on the building drum, in the same manner as described in document WO-2005/105419.

The supporting member 29 from which the sidewall inserts 11 have been picked up is translated along the actuating circuits 47 to be moved away from the transfer station 28 and allow positioning in said station of the next supporting member 29.

In an embodiment not shown in the drawings, the drive arms 42 can be conveniently provided with specific thrust members, preferably two in number for each arm 42, disposed in cantilevered fashion and towards the inside with respect to said arms 42, so that they do not interfere, during the thrust or pulling operation carried out on the locating elements 45, with the structure of the transfer members 32 and 53.

In a further alternative solution, the actuating circuits can also be conveniently made on two levels. More specifically, it is possible to provide two supporting members 29 disposed at different heights from the ground, i.e. one to a lower level and one to a higher level, but rigidly connected to the traction member 48 by a single support 36.

In this case the first and second transfer members 32 and 53 will be provided with a vertical slide guide so that they can also reach operating positions at different heights from the ground. It will be the same for the first and second handlers, 40 and 52 respectively, that in turn must reach different heights.

The advantage of the last-mentioned solution resides in the possibility of storing a double number of annular elastomer components in the same area.

The invention claimed is:

1. A method of manufacturing pneumatic tyres, each pneumatic tyre comprising:
   a carcass structure having at least one carcass ply and annular anchoring structures engaging respective end flaps of the carcass ply;
   a tread band at a radially external position to the carcass structure;
   a belt structure interposed between the carcass structure and the tread band;
   a pair of axially opposite sidewalls radially extending from each end flap of the carcass ply to the tread band, the method comprising:
   assembling at least one annular elastomer component on a building drum, wherein said assembling step comprises the steps of:
      forming said at least one annular elastomer component;
      storing said at least one annular elastomer component on a movable storing device carrying a plurality of said previously-stored annular elastomer components;
      transporting said at least one annular elastomer component until close to said building drum; and
      transferring said at least one annular elastomer component from the movable storing device to the building drum;
      wherein the storing step comprises the step of engaging the annular elastomer component on circumferentially distributed abutment elements carried by the movable storing device;
   where said abutment elements are driven from a rest condition at which they are spaced apart from the annular elastomer component, to an operating condition at which they act against the annular elastomer component; and
   wherein movement of the abutment element from the rest condition to the operating condition is carried out by submitting the movable storing device to action of a first handler installed in a fixed storage station.

2. The method as claimed in claim 1, wherein said abutment elements act against a radially internal surface of the annular elastomer component.

3. The method as claimed in claim 1, wherein said abutment elements are locked to the operating position before terminating the transferring step.

4. The method as claimed in claim 1, further comprising the step of counteracting translation of the abutment elements away from the rest condition on reaching of the operating condition, by means of counter-forces circumferentially distributed against the annular elastomer component, on an opposite side from said abutment elements.

5. The method as claimed in claim 1, further comprising the steps of:
engaging said at least one annular elastomer component on a first transfer member; and
removing said at least one annular elastomer component from the first transfer member to store the annular elastomer component on the movable storing device.

6. The method as claimed in claim 1, wherein removal of the annular elastomer component from the movable storing device comprises movement of the abutment elements from the operating condition to the rest condition.

7. The method as claimed in claim 6, wherein movement of the abutment elements from the operating condition to the rest condition is carried out by submitting the movable storing device to the action of a second handler installed in a fixed transfer station.

8. The method as claimed in claim 1, further comprising the steps of:
removing said at least one annular elastomer component from the movable storing device to engage said at least one annular elastomer component with a second transfer member; and
disengaging said at least one annular elastomer component from the second transfer member to transfer said at least one annular elastomer component to the building drum.

9. The method as claimed in claim 1, wherein said at least one annular elastomer component is formed as a one piece construction.

10. The method as claimed in claim 1, wherein the step of forming said at least one annular elastomer component is carried out by compression moulding.

11. The method as claimed in claim 1, wherein the step of forming said at least one annular elastomer component is carried out through winding of at least one continuous elongated element into coils disposed close to each other on a forming drum.

12. The method as claimed in claim 1, comprising the steps of:
assembling at least one pair of annular sidewall inserts on the building drum, each insert extending away from one of said annular anchoring structures,
wherein each of the sidewall inserts comprises said at least one annular elastomer component that is assembled by said storing, loading, transporting and transferring steps.

13. The method as claimed in claim 12, wherein each sidewall insert radially extends through a point of maximum chord of the tyre.

14. The method as claimed in claim 12, wherein each sidewall insert has an inner apex close to respective annular anchoring structure, and an outer apex close to a side edge of a belt structure of the tyre.

15. The method as claimed in claim 12, comprising the steps of:
applying a liner onto the building drum carrying said sidewall inserts;
associating said at least one carcass ply with the liner and the sidewall inserts carried by the building drum; and
associating said annular anchoring structures with the carcass ply.

16. The method as claimed in claim 15, wherein during said liner-applying step, axially opposite edges of the liner are each engaged along an inner apex of one of said sidewall inserts.

17. The method as claimed in claim 1, wherein each of said sidewalls comprises said at least one annular elastomer component that is assembled by said storing, loading, transporting and transferring steps.

18. The method as claimed in claim 1, comprising the steps of:
assembling at least one pair of annular under-belt inserts on the building drum, said inserts being radially interposed between the carcass ply and axially opposite edges of the belt structure, wherein each of the under-belt inserts comprises said at least one annular elastomer component that is assembled by said forming, storing, transporting and transferring steps.

19. The method as claimed in claim 1, wherein said transporting step comprises the step of translating said at least one annular elastomer component along an actuating circuit extending in a closed loop.

20. The method as claimed in claim 19, wherein the storing and transferring steps are carried out in a storage station and the transfer station respectively, which are mutually spaced apart.

21. The method as claimed in claim 20, wherein said storage station and transfer station are located along the actuating circuit.

22. The method as claimed in claim 20, wherein said transporting step further comprises the step of translating the actuating circuit from said storage station to said transfer station.

23. The method as claimed in claim 20, wherein the actuating circuit is coupled with at least one first and one second traction motors to translate said at least one annular elastomer component into the storage station and the transfer station respectively.

24. A method of manufacturing pneumatic tyres, each pneumatic tyre having:
a carcass structure having at least one carcass ply and annular anchoring structures engaging respective end flaps of the carcass ply;
a tread band at a radially external position to the carcass structure;
a belt structure interposed between the carcass structure and the tread band;
a pair of axially opposite sidewalls radially extending from each end flap of the carcass ply to the tread band, the method comprising:
assembling at least one annular elastomer component on a building drum, wherein said assembling step comprises the steps of:
forming said at least one annular elastomer component;
storing said at least one annular elastomer component on a movable storing device carrying a plurality of said previously-stored annular elastomer components;
transporting said at least one annular elastomer component until close to said building drum;

transferring said at least one annular elastomer component from the movable storing device to the building drum; and wherein said transporting step comprises the step of translating said at least one annular elastomer component along an actuating circuit extending in a closed loop.

25. The method as claimed in claim 24, wherein the storing and transferring steps are carried out in a storage station and a transfer station respectively, that are mutually spaced apart.

26. The method as claimed in claim 25, wherein said storage station and transfer station are located along the actuating circuit.

27. The method as claimed in claim 25, wherein said transporting step further comprises the step of translating the actuating circuit from said storage station to said transfer station.

28. The method as claimed in claim 25, wherein the actuating circuit is coupled with at least one first and one second traction motors to translate said at least one annular elastomer component into the storage station and the transfer station respectively.

29. A method of manufacturing pneumatic tyres, each pneumatic tyre having:
- a carcass structure having at least one carcass ply and annular anchoring structures engaging respective end flaps of the carcass ply;
- a tread band at a radially external position to the carcass structure;
- a belt structure interposed between the carcass structure and the tread band;
- a pair of axially opposite sidewalls radially extending from each end flap of the carcass ply to the tread band, the method comprising:
- assembling at least one annular elastomer component on a building drum, wherein said assembling step comprises the steps of:
  - forming said at least one annular elastomer component;
  - storing said at least one annular elastomer component on a movable storing device carrying a plurality of said previously-stored annular elastomer components;
  - transporting said at least one annular elastomer component until close to said building drum;
  - transferring said at least one annular elastomer component from the movable storing device to the building drum; and
- wherein the step of forming said at least one annular elastomer component is carried out by injection moulding.

30. A method of manufacturing pneumatic tyres, each pneumatic tyre having:
- a carcass structure having at least one carcass ply and annular anchoring structures engaging respective end flaps of the carcass ply;
- a tread band at a radially external position to the carcass structure;
- a belt structure interposed between the carcass structure and the tread band;
- a pair of axially opposite sidewalls radially extending from each end flap of the carcass ply to the tread band, the method comprising:
- assembling at least one annular elastomer component on a building drum, wherein said assembling step comprises the steps of;
  - forming said at least one annular elastomer component;
  - storing said at least one annular elastomer component on a movable storing device carrying a plurality of said previously-stored annular elastomer components;
  - transporting said at least one annular elastomer component until close to said budding drum; and
  - transferring said at least one annular elastomer component from the movable storing device to the building drum;
- wherein said at least one elastomer component is uncoupled from any elongated structural reinforcing insert during each of said forming, storing, transporting and transferring steps.

31. A method of manufacturing pneumatic tyres, each pneumatic tyre comprising:
- a carcass structure having at least one carcass ply and annular anchoring structures engaging respective end flaps of the carcass ply;
- a tread band at a radially external position to the carcass structure;
- belt structure interposed between the carcass structure and the tread band;
- a pair of axially opposite sidewalls radially extending from each end flap of the carcass ply to the tread band, the method comprising:
- assembling at least one annular elastomer component on a building drum, wherein said assembling step comprises the steps of:
  - forming said at least one annular elastomer component;
  - storing said at least one annular elastomer component on a movable storing device carrying a plurality of said previously-stored annular elastomer components;
  - transporting said at least one annular elastomer component until close to said building drum;
  - transferring said at least one annular elastomer component from the movable storing device to the building drum;
- wherein the storing step comprises the step of engaging the annular elastomer component on circumferentially distributed abutment elements carried by the movable storing device;
- wherein said abutment elements are driven from a rest condition at which they are spaced apart from the annular elastomer component, to an operating condition at which they act against the annular elastomer component;
- wherein removal of the annular elastomer component from the movable storing device comprises movement of the abutment elements from the operating condition to the rest condition; and
- wherein movement of the abutment elements from the operating condition to the rest condition is carried out by submitting the movable storing device to the action of a second handler installed in a fixed transfer station.

32. The method as claimed in claim 31, wherein said abutment elements act against a radially internal surface of the annular elastomer component.

33. The method as claimed in claim 31, wherein said abutment elements are locked to the operating position before terminating the transferring step.

34. The method as claimed in claim 31, further comprising the step of counteracting translation of the abutment elements away from the rest condition on reaching of the operating condition, by means of counter-forces circumferentially distributed against the annular elastomer component, on an opposite side from said abutment elements.

35. The method as claimed in claim 31, further comprising the steps of:
- engaging said at least one annular elastomer component on a first transfer member; and
- removing said at least one annular elastomer component from the first transfer member to store the annular elastomer component on the movable storing device.

36. The method as claimed in claim 31, further comprising the steps of:
- removing said at least one annular elastomer component from the movable storing device to engage said at least one annular elastomer component with a second transfer member; and
- disengaging said at least one annular elastomer component from the second transfer member to transfer said at least one annular elastomer component to the building drum.

37. The method as claimed in claim 31, wherein said transporting step comprises the step of translating said at least one annular elastomer component along an actuating circuit extending in a closed loop.

38. The method as claimed in claim 37, wherein the storing and transferring steps are carried out in a storage station and the transfer station respectively, which are mutually spaced apart.

39. The method as claimed in claim 38, wherein said storage station and transfer station are located along the actuating circuit.

40. The method as claimed in claim 38, wherein said transporting step further comprises the step of translating the actuating circuit from said storage station to said transfer station.

41. The method as claimed in claim 38, wherein the actuating circuit is coupled with at least one first and one second traction motors to translate said at least one annular elastomer component into the storage station and the transfer station respectively.

42. The method as claimed in claim 31, wherein said at least one annular elastomer component is formed as a one piece construction.

43. The method as claimed in claim 31, wherein the step of forming said at least one annular elastomer component is carried out by compression moulding.

44. The method as claimed in claim 31, wherein the step of forming said at least one annular elastomer component is carried out through winding of at least one continuous elongated element into coils disposed close to each other on a forming drum.

45. The method as claimed in claim 31, comprising the steps of:
- assembling at least one pair of annular sidewall inserts on the building drum, each insert extending away from one of said annular anchoring structures,
- wherein each of the sidewall inserts comprises said at least one annular elastomer component that is assembled by said storing, loading, transporting and transferring steps.

46. The method as claimed in claim 45, wherein each sidewall insert radially extends through a point of maximum chord of the tyre.

47. The method as claimed in claim 45, wherein each sidewall insert has an inner apex close to respective annular anchoring structure, and an outer apex close to a side edge of a belt structure of the tyre.

48. The method as claimed in claim 45, comprising the steps of:
- applying a liner onto the building drum carrying said sidewall inserts;
- associating said at least one carcass ply with the liner and the sidewall inserts carried by the building drum; and
- associating said annular anchoring structures with the carcass ply.

49. The method as claimed in claim 48, wherein during said liner-applying step, axially opposite edges of the liner are each engaged along an inner apex of one of said sidewall inserts.

50. The method as claimed in claim 31, wherein each of said sidewalls comprises said at least one annular elastomer component that is assembled by said storing, loading, transporting and transferring steps.

51. The method as claimed in claim 31 comprising the steps of:
- assembling at least one pair of annular under-belt inserts on the building drum, said inserts being radially interposed between the carcass ply and axially opposite edges of the belt structure, wherein each of the under-belt inserts comprises said at least one annular elastomer component that is assembled by said forming, storing, transporting and transferring steps.

* * * * *